(12) United States Patent
Cromer et al.

(10) Patent No.: US 7,389,352 B2
(45) Date of Patent: Jun. 17, 2008

(54) SYSTEM AND METHOD FOR CONCURRENT WLAN AND WPAN WIRELESS MODES FROM A SINGLE DEVICE

(75) Inventors: Daryl Carvis Cromer, Apex, NC (US); Philip John Jakes, Durham, NC (US); Howard Jeffrey Locker, Cary, NC (US); Michael T. Vanover, Raleigh, NC (US)

(73) Assignee: Lenovo Singapore Pte. Ltd, Singapore (SG)

( * ) Notice: Subject to any disclaimer, the term of this patent is extended or adjusted under 35 U.S.C. 154(b) by 875 days.

(21) Appl. No.: 10/747,704

(22) Filed: Dec. 24, 2003

(65) Prior Publication Data

US 2005/0165916 A1   Jul. 28, 2005

(51) Int. Cl.
*G06F 13/00* (2006.01)
(52) U.S. Cl. ..................... 709/227; 709/219; 709/250
(58) Field of Classification Search ................. 709/217, 709/219, 220, 223, 225, 227, 228, 250
See application file for complete search history.

(56) References Cited

U.S. PATENT DOCUMENTS

| | | | |
|---|---|---|---|
| 7,095,748 B2 * | 8/2006 | Vij et al. ..................... 370/401 |
| 7,146,133 B2 * | 12/2006 | Bahl et al. .................. 455/63.1 |
| 2002/0061031 A1 | 5/2002 | Sugar et al. ................. 370/466 |
| 2003/0054788 A1 | 3/2003 | Sugar et al. .................. 455/323 |
| 2003/0114206 A1 | 6/2003 | Timothy et al. ............. 455/575 |
| 2003/0144009 A1 | 7/2003 | Nowlin ........................ 455/456 |
| 2004/0242197 A1 * | 12/2004 | Fontaine ..................... 455/411 |
| 2005/0048997 A1 * | 3/2005 | Grobler et al. ........... 455/550.1 |
| 2005/0091357 A1 * | 4/2005 | Krantz et al. ................ 709/223 |
| 2005/0208950 A1 | 9/2005 | Hasse ......................... 455/453 |

FOREIGN PATENT DOCUMENTS

| | | |
|---|---|---|
| WO | WO 200260124 A2 | 8/2002 |
| WO | WO 03/001742 | 1/2003 |

* cited by examiner

*Primary Examiner*—Viet D. Vu
(74) *Attorney, Agent, or Firm*—Van Leeuwen & Van Leeuwen; Carlos Munoz-Bustamante

(57) ABSTRACT

A system and method for concurrent WLAN and WPAN wireless modes from a single device is presented. A client uses a Wi-Fi device's infrastructure mode to communicate in a WLAN environment and, during idle WLAN times, uses the Wi-Fi device's adhoc mode to communicate in a WPAN environment. The Wi-Fi device uses a watchdog timer to switch between infrastructure mode and adhoc mode. When the client's Wi-Fi device switches to infrastructure mode, the client's Wi-Fi device uses an infrastructure register and an infrastructure device driver to transfer data over the WLAN environment. Likewise, when the client's Wi-Fi device switches to adhoc mode, the client's Wi-Fi device uses an adhoc register and an adhoc device driver to transfer data over the WLAN environment. The client uses a code shim to act as a virtual device driver at times when either the infrastructure device driver or the adhoc device driver is inactive.

20 Claims, 9 Drawing Sheets

SYSTEM AND METHOD FOR CONCURRENT WLAN AND WPAN WIRELESS MODES FROM A SINGLE DEVICE

BACKGROUND OF THE INVENTION

1. Technical Field

The present invention relates in general to a system and method for communicating concurrently in a plurality of wireless environments using a single device. More particularly, the present invention relates to a system and method for using a single Wi-Fi device to concurrently communicate in a wireless LAN environment and a wireless PAN environment.

2. Description of the Related Art

Wi-Fi technology is rapidly being adapted for use in wireless local area networks (WLAN's). A wireless LAN is one in which a mobile user connects to a local area network (LAN) through a wireless connection. Wi-Fi technology is gaining acceptance in consumer and commercial markets as an alternative to a wired LAN due to its excellent interoperability and commodity pricing. Wi-Fi is specified in the Institute of Electrical and Electronics Engineers (IEEE) 802.11 specification (including additions and changes specified in 802.11a, 802.11b, etc). Wi-Fi specifies an Ethernet-like protocol which uses CSMA/CA (carrier sense multiple access with collision avoidance) for channel sharing. Wi-Fi technology currently operates in the 2.4 GHz ISM frequency band or the 5 GHz U-NII frequency band and offers data rates up to 54 Mbps.

Another standard, Bluetooth, revolves around a wireless personal area network (WPAN). Bluetooth is the most common WPAN technology and was used as the basis for the IEEE 802.15.1 standard. A wireless personal area network (WPAN) is used to wirelessly interconnect devices centered on an individual person through a point-to-point or peer-to-peer connection. Typically, a wireless personal area network uses technology that permits communication within a very short range, such as ten meters. A WPAN may serve to interconnect ordinary computing and communicating devices that many people carry with them today. A challenge found, however, is that many peripheral devices, such as printers and handheld devices, are required to support both WLAN interoperability for infrastructure network communication as well as WPAN interoperability for point-to-point communication.

Wi-Fi technology could replace Bluetooth technology as a technology to support WPAN environments, all the while providing lower system cost, higher bandwidth, and better interoperability. A challenge found, however, is that existing Wi-Fi technology does not allow a single device to simultaneously or concurrently support both infrastructure and peer-to-peer environments. In order to support simultaneous infrastructure and peer-to-peer environments using Wi-Fi technology, two Wi-Fi devices are required, one for each environment, thereby increasing a computer system's equipment cost.

What is needed, therefore, is a system and method to support concurrent infrastructure and peer-to-peer environments using a single Wi-Fi device.

SUMMARY

It has been discovered that the aforementioned challenges are resolved by using a Wi-Fi device's infrastructure mode to communicate in a WLAN environment and, during idle WLAN intervals, using the Wi-Fi device's adhoc mode to communicate in a WPAN environment.

A user wishes to concurrently communicate over a WLAN network and a WPAN network. For example, the user's client may display a presentation by interfacing to a projector over a WPAN, and request access to the Internet over a WLAN. The user's client uses a Wi-Fi device to communicate over wireless networks whereby the Wi-Fi device includes an infrastructure register and an adhoc register. The infrastructure register stores an infrastructure configuration profile that includes information regarding an infrastructure network (i.e. WLAN), such as a channel number and an IP address. The adhoc register stores an adhoc configuration profile that includes information regarding an adhoc network (i.e. WPAN), such as a channel number and a network name.

The client's Wi-Fi device uses a watchdog timer to switch between infrastructure mode and adhoc mode. When the client's Wi-Fi device switches to infrastructure mode, the client's Wi-Fi device loads and uses information included in the infrastructure register. Likewise, when the client switches to adhoc mode, the client's Wi-Fi device loads and uses information included in the adhoc register.

In addition, the client includes an infrastructure driver, an adhoc driver, and a "code shim". When the client's Wi-Fi device is in infrastructure mode, the client uses the infrastructure driver to send and receive information to an access point over an infrastructure network (i.e. WLAN). When the client's Wi-Fi device is in adhoc mode, the client uses the adhoc driver to send/receive information to/from a peer-to-peer device, such as a projector or a printer, over the adhoc network (i.e. WPAN).

During times when the client's Wi-Fi device is in infrastructure mode, the adhoc driver is inactive and the code shim acts as a virtual adhoc device driver to the client's operating system. Likewise, when the client's Wi-Fi device is in adhoc mode, the infrastructure driver is inactive and the code shim acts as a virtual infrastructure device driver to the client's operating system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
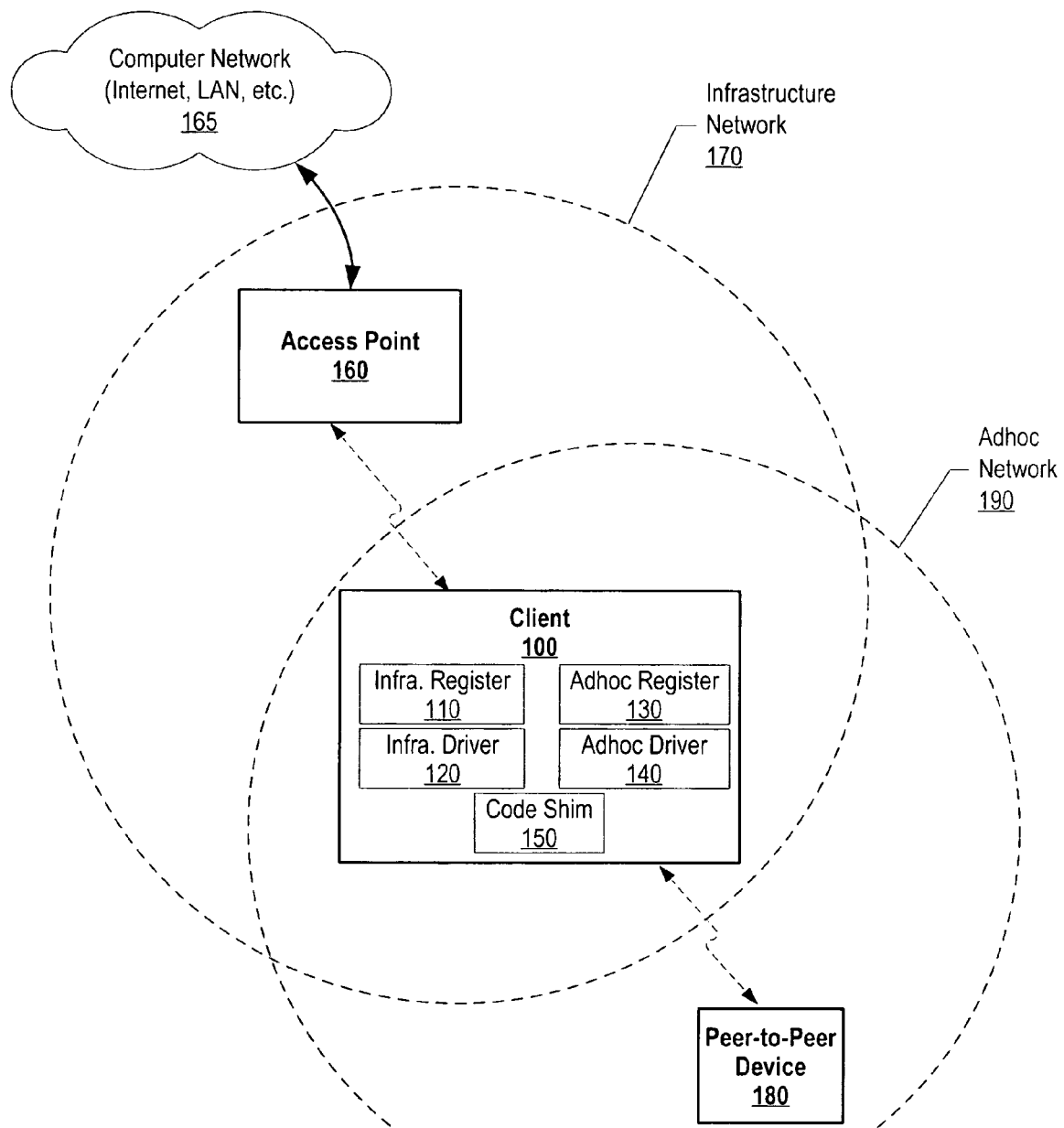
FIG. 1 is a diagram showing a client using a single Wi-Fi device to concurrently operate in both a Wireless LAN (WLAN) environment and a Wireless Personal Area Network (WPAN) environment.

FIG. 1 is a diagram showing a client using a single Wi-Fi device to concurrently operate in both a Wireless LAN (WLAN) environment and a Wireless Personal Area Network (WPAN) environment. Client 100 uses a Wi-Fi device in "infrastructure" mode at intervals when client 100 is communicating in a WLAN environment and client 100 uses the same device in "adhoc" mode at intervals when client 100 is communicating in a WPAN environment.

Client 100 includes infrastructure register 110 and adhoc register 130. Infrastructure register 110 stores an infrastructure configuration profile that includes information regarding infrastructure network 170, such as a channel number and an IP address. Adhoc register 130 stores an adhoc configuration profile that includes information regarding adhoc network 190, such as a channel number and a network name.

Client 100's Wi-Fi device uses a watchdog timer to switch between infrastructure mode and adhoc mode. When client 100's Wi-Fi device switches to infrastructure mode, client 100's Wi-Fi device loads and uses information included in infrastructure register 110. Likewise, when client 100 switches to adhoc mode, client 100's Wi-Fi device loads and uses information included in adhoc register 130.

In addition, client 100 includes infrastructure driver 120, adhoc driver 140, and code shim 150. When client 100's Wi-Fi device is in infrastructure mode, client 100 uses infrastructure driver 120 to send and receive information to access point 160 over infrastructure network 170. Access point 160 is a wireless LAN device that also allows client 100 to access computer network 165, such as the Internet (see FIG. 8 and corresponding text for further details regarding access point properties). When client 100's Wi-Fi device is in adhoc mode, client 100 uses adhoc driver 140 to send and receive information to peer-to-peer device 180 over adhoc network 190. Peer-to-peer device 180 is a wireless PAN device, such as a projector, PDA, or printer (see FIG. 9 and corresponding text for further details regarding peer-to-peer device properties).

During intervals when client 100's Wi-Fi device is in infrastructure mode, adhoc driver 140 is inactive and code shim 150 acts as a virtual adhoc device driver to client 100's operating system. Likewise, when client 100's Wi-Fi device is in adhoc mode, infrastructure driver 120 is inactive and code shim 150 acts as a virtual infrastructure device driver to client 100's operating system (see FIGS. 2, 3, and corresponding text for further details regarding code shim properties).

Figure 2:
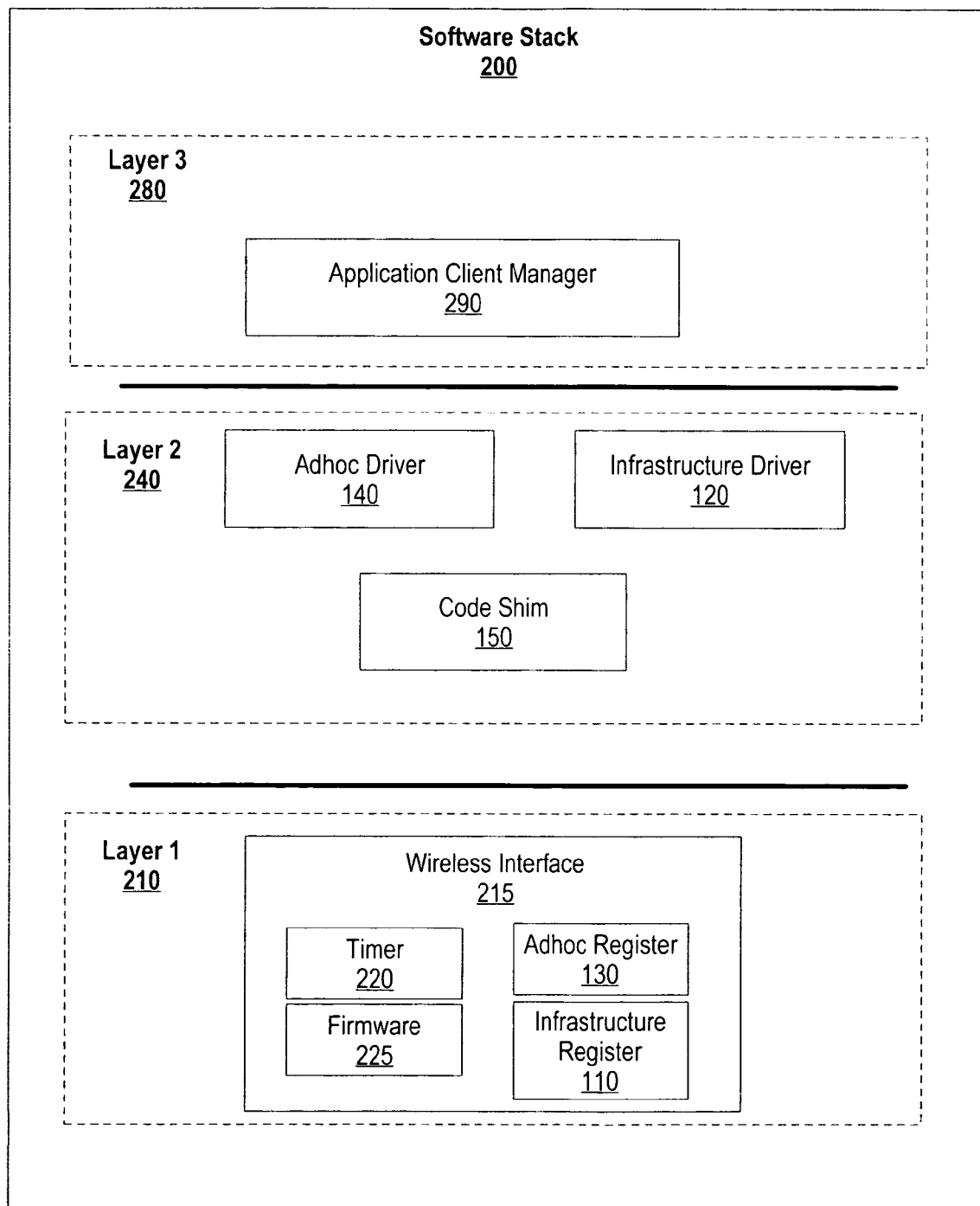
FIG. 2 is a diagram showing a client's software stack that supports both infrastructure mode and adhoc mode.

FIG. 2 is a diagram showing a client's software stack that supports both infrastructure mode and adhoc mode. Software stack 200 includes layer 1 210, layer 2 240, and layer 3 280. Layer 1 210 interfaces with a client's wireless interface hardware using wireless interface 215. Wireless interface includes timer 220, firmware 225, adhoc register 130, and infrastructure register 110. Wireless interface 215 uses timer 220 as a timer to switch between adhoc mode and infrastructure mode (see FIGS. 3, 5, and corresponding text for further details regarding timer use).

A client's wireless device loads and uses adhoc configuration profile information included in adhoc register 130 during adhoc mode. The adhoc configuration profile includes settings, such as a channel number and a network name, that the client's wireless device uses to communicate with a peer-to-peer device over an adhoc (i.e. WPAN) network. A client's wireless device loads and uses infrastructure configuration profile information included in infrastructure register 110 while it is in infrastructure mode. The infrastructure configuration profile includes settings, such as a channel number and an IP address, that the client's wireless device uses to communicate with a peer-to-peer device over an infrastructure (i.e. WLAN) network. Adhoc register 130 and infrastructure register 110 are the same as that shown in FIG. 1. Firmware 225 includes standard firmware to operate the client's wireless hardware.

Layer 2 240 includes adhoc driver 140, infrastructure driver 120, and code shim 150, which are the same as that shown in FIG. 1. The client's operating system uses adhoc driver 140 to transfer data to/from a peer-to-peer device over an adhoc network. Likewise, the client's operating system uses infrastructure driver 120 to transfer data to/from an access point over an infrastructure network. Code shim 150 acts as a virtual device driver for either adhoc driver 140 or infrastructure driver 120 when either of them is inactive. For example, when a client's wireless device is in infrastructure mode, adhoc driver 140 is inactive and code shim 150 acts as a virtual adhoc device driver to the client's operating system (see FIG. 3 and corresponding text for further details regarding driver availability).

Layer 3 280 includes application client manager 290 which is an interface that is used to set up the wireless client for connecting to a WLAN and/or a WPAN device.

Figure 3:
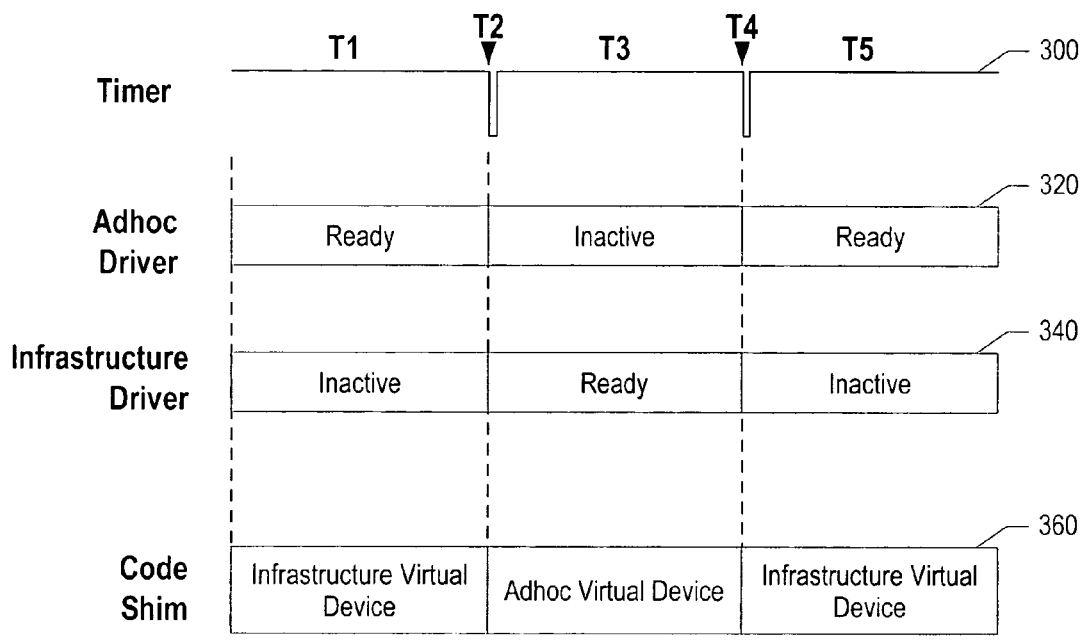
FIG. 3 is a timing diagram showing a client that is switching modes based upon the expiration of a timer.

FIG. 3 is a timing diagram showing a client that is switching modes based upon the expiration of a timer. Timeline 300 shows a watchdog timer running, expiring, and resetting. Adhoc driver status line 320 shows an adhoc driver's status at particular time intervals. Infrastructure driver status line 340 shows an infrastructure driver's status at particular time intervals. Finally, code shim status line 360 shows the status of code shim software acting as a virtual device driver.

At time T1, adhoc driver status line 320 shows that the adhoc driver is ready to send/receive data to/from a peer-to-peer device. Also at time T1, infrastructure driver status line 340 shows that the infrastructure driver is inactive, or offline. In turn, at time T1, code shim status line 360 shows that the code shim is functioning as an infrastructure virtual device driver to a client's operating system during time T1 in order to maintain a network connection.

At time T2, the watchdog timer expires and resets. At time T3, the adhoc driver becomes inactive (i.e. offline), and the infrastructure driver becomes ready. In turn, code shim status line 360 shows, at time T3, that the code shim code switches from being an infrastructure virtual device driver to becoming an adhoc virtual device driver.

At time T4, the timer expires and resets once again. At time T5, the infrastructure driver becomes inactive (i.e. offline), and the adhoc driver becomes ready once again. In turn, code shim status line 360 shows, at time T5, that the code shim code switches from being an adhoc virtual device driver to becoming an infrastructure virtual device driver.

Figure 4:
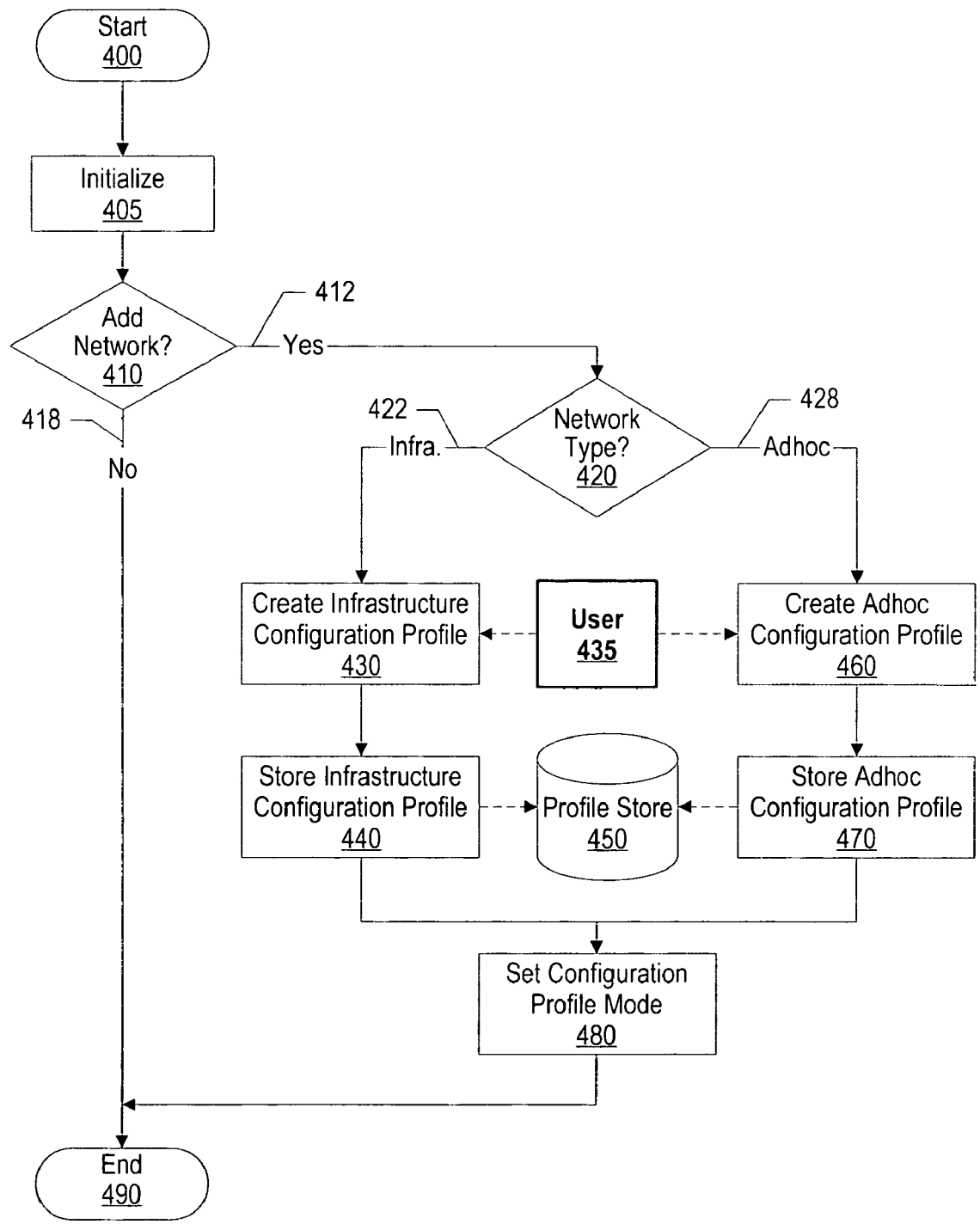
FIG. 4 is a flowchart showing steps taken in a client's wireless device initializing and adding a new network.

FIG. 4 is a flowchart showing steps taken in a client's wireless device initializing and adding a new network. Processing commences at 400, whereupon processing initializes at step 405. A determination is made as to whether to add a new network profile (decision 410). For example, a user may travel to a new worksite and wish to use a particular overhead projector that communicates on a WPAN. In this example, the user adds an adhoc network that corresponds to the overhead projector's WPAN.

If a new network profile does not need to be added, decision 410 branches to "No" branch 418 bypassing network addition steps, and processing ends at 490. On the other hand, if a user wishes to add a new network, decision 410 branches to "Yes" branch 412 whereupon a determination is made as to which type of network to add (decision 420). If the user wishes to add an infrastructure network, decision 420 branches to "Infrastructure" branch 422 whereupon processing receives information from user 435 and creates an infrastructure configuration profile at step 430. For example, the user may provide a network name that corresponds to a new infrastructure network. Once configured, the new infrastructure configuration profile is stored in profile store 450 at step 440. Profile store 450 may be stored on a nonvolatile storage area, such as a nonvolatile memory.

On the other hand, if the user wishes to add an adhoc network, decision 420 branches to "Adhoc" branch 428 whereupon processing receives information from user 435 and creates an adhoc configuration profile at step 460. For example, the user may provide a network name that corresponds to a new adhoc network. Once configured, the new adhoc configuration profile is stored in profile store 450 at step 470.

Once processing stores either an infrastructure configuration profile or an adhoc configuration profile, processing sets a configuration profile mode at step 480. The configuration profile mode informs the client's wireless device as to whether the client should operate in adhoc mode, in infrastructure mode, or both modes. Processing ends at 490.

Figure 5:
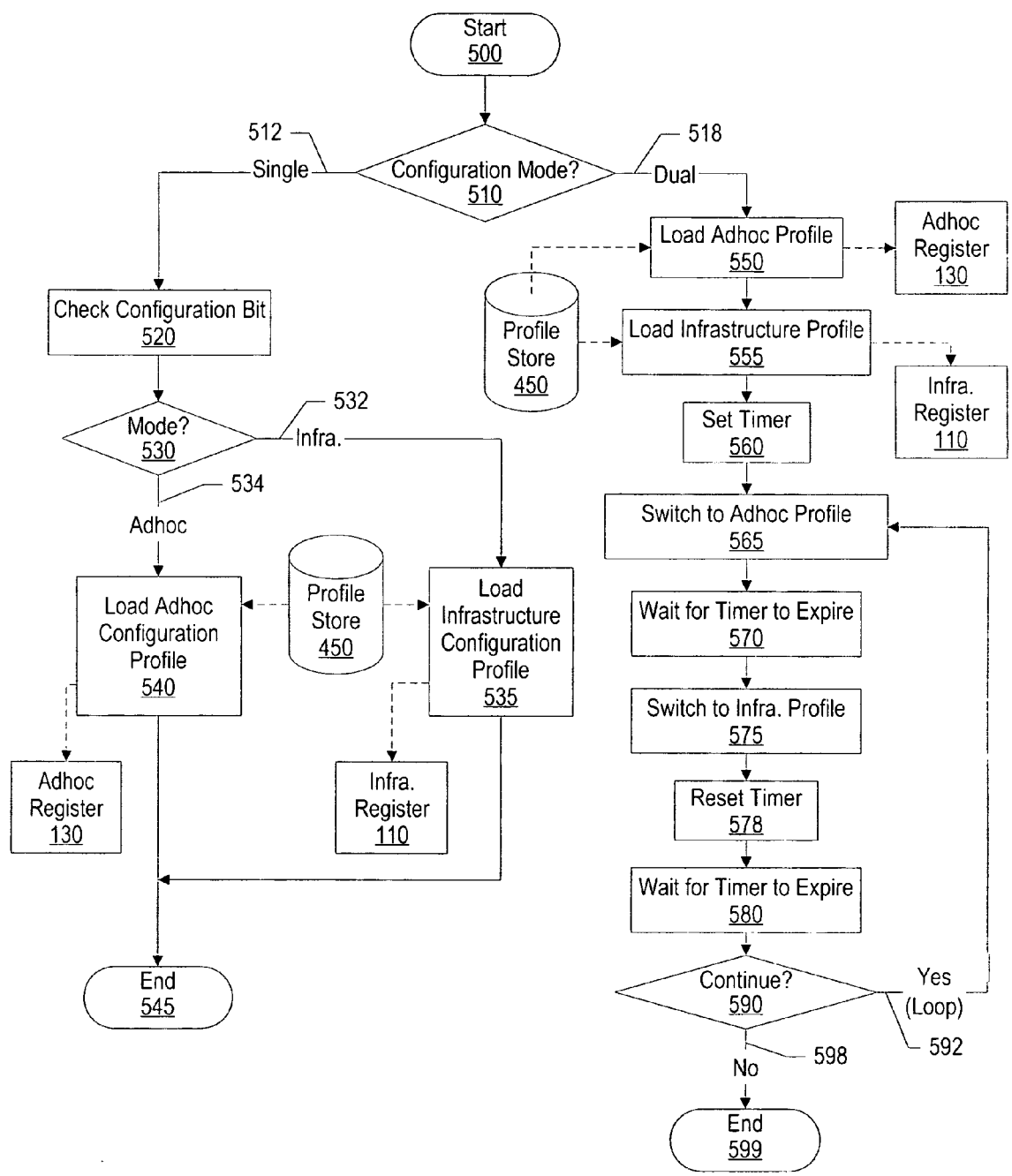
FIG. 5 is a flowchart showing steps taken in a client's wireless device loading configuration profiles based upon configuration and network modes.

FIG. 5 is a flowchart showing steps taken in a client's wireless device loading configuration profiles based upon configuration and network modes. Processing commences at 500, whereupon a determination is made as to whether to operate in a single configuration mode or a dual configuration mode based on whether both WLAN and WPAN network connections are required by the client (decision 510). This is dynamically decided based upon applications that are being run by a user, such as printing to a WPAN-based printer while connected to an infrastructure WLAN.

If the client's wireless device should operate in single configuration mode, decision 510 branches to "Single" branch 512 whereupon processing checks a configuration bit at step 520. The configuration bit identifies whether the client should operate in infrastructure mode or adhoc mode. A determination is made as to whether the client should operate in infrastructure mode or adhoc mode (decision 530).

If the client's wireless device should operate in infrastructure mode, decision 530 branches to "Infrastructure" branch 532 whereupon processing retrieves an infrastructure configuration profile from profile store 450, and loads the profile in infrastructure register 110 (step 535). Infrastructure register 110 and profile store 450 and are the same as that shown in FIGS. 1 and 4, respectively.

On the other hand, if the client should operate in adhoc mode, decision 530 branches to "Adhoc" branch 534 whereupon processing retrieves an adhoc configuration profile from profile store 450, and loads the profile in adhoc register 130 (step 540). Adhoc register 130 is the same as that shown in FIG. 1. Processing ends at 545.

If the client's wireless device should operate in dual configuration mode, decision 510 branches to "Dual" branch 518 whereupon processing retrieves an adhoc configuration profile from profile store 450, and loads the profile in adhoc register 130 (step 550). At step 555, processing retrieves an infrastructure configuration profile from profile store 450, and loads the profile in infrastructure register 110. Processing sets a watchdog timer at step 560 which informs the client's wireless device when to switch between adhoc mode and infrastructure mode.

Processing starts in adhoc configuration profile mode at step 565. As one skilled in the art can appreciate, a client's wireless device may start in infrastructure configuration profile mode. Processing stays in adhoc mode until the watchdog timer expires (step 570), at which point processing switches to infrastructure configuration profile mode at step 575. Processing resets the timer at step 578, and waits for the timer to expire at step 580, all the while in infrastructure mode.

Once the watchdog timer expires, a determination is made as to whether to continue processing (decision 590). If processing should continue, decision 590 branches to "Yes" branch 592 which loops back to switch profiles. This looping continues until processing should stop, at which point decision 590 branches to "No" branch 598 whereupon processing ends at 599.

Figure 6:
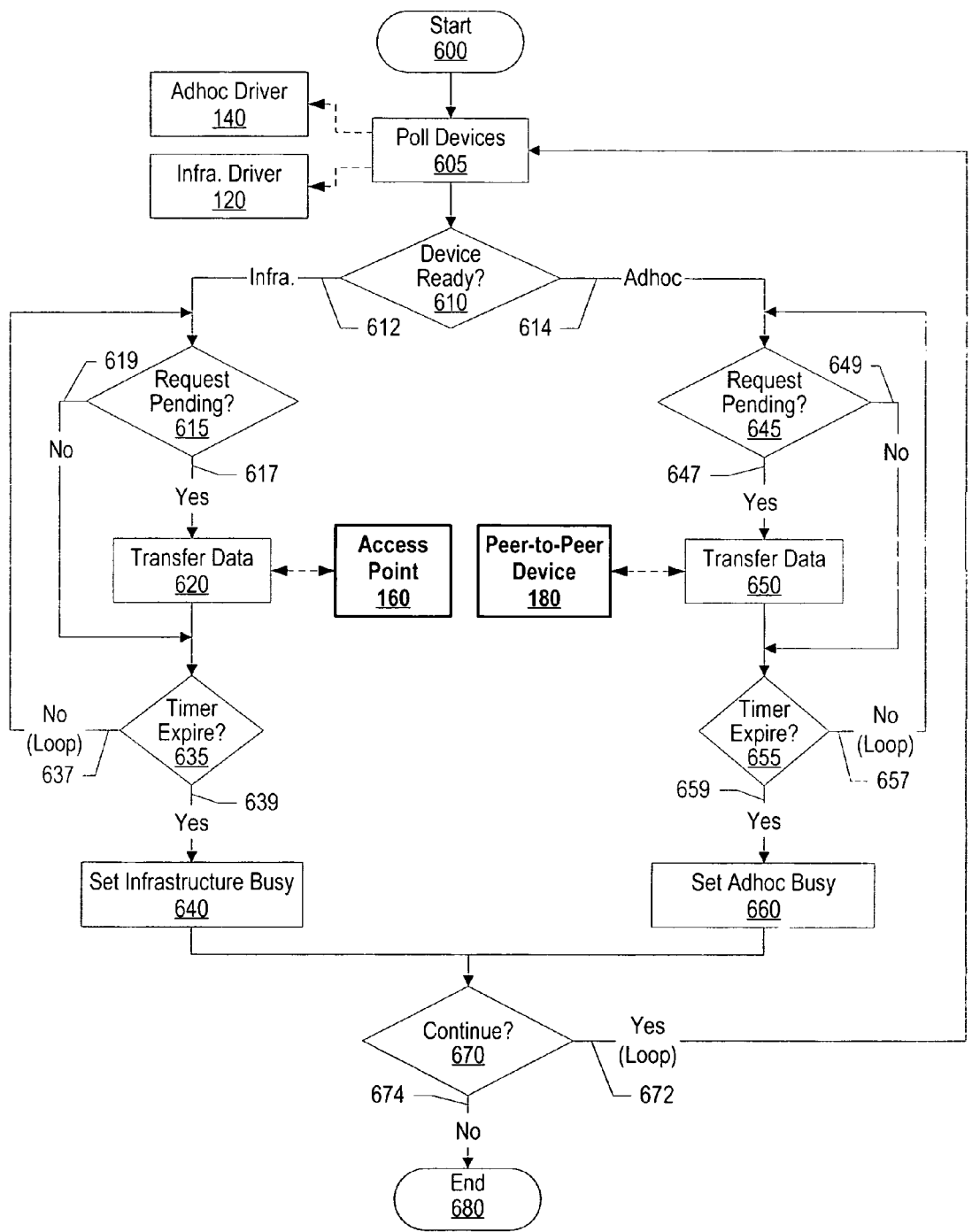
FIG. 6 is a flowchart showing steps taken in a client sending data to an access point and a peer-to-peer device.

FIG. 6 is a flowchart showing steps taken in a client sending data to an access point and a peer-to-peer device. Processing commences at 600, whereupon processing polls adhoc device driver 140 and infrastructure device driver 120. Adhoc device driver 140 and infrastructure device driver 120 are the same as that shown in FIG. 1. A determination is made as to which device is in a ready state (decision 610).

If infrastructure device driver 120 is in the ready state, decision 610 branches to "Infrastructure" branch 612 whereupon a determination is made as to whether a request is pending to send or receive data to an access point (decision 615). If a request is pending, decision 615 branches to "Yes" branch 617 whereupon processing uses infrastructure device driver 120 to transfer data to/from access point 160 (step 620). Access point 160 is the same as that shown in FIG. 1. On the other hand, if a request is not pending, decision 615 branches to "No" branch 619 bypassing data transfer steps.

A determination is made as to whether a watchdog timer has expired (decision 635) (see FIG. 3 and corresponding text for further details watchdog timer expiration). If the watchdog timer has not yet expired, decision 635 branches to "No" branch 637 which loops back to process more requests. This looping continues until the watchdog timer expires, at which point decision 635 branches to "Yes" branch 639, whereupon processing sets the infrastructure configuration mode busy (e.g. infrastructure driver 120) at step 640.

If adhoc device driver 140 is in the ready state, decision 610 branches to "Adhoc" branch 614 whereupon a determination is made as to whether a request is pending to send and/or receive data from a peer-to-peer device (decision 645). If a request is pending, decision 645 branches to "Yes" branch 647 whereupon processing uses adhoc device driver 140 to transfer data to/from peer-to-peer device 180 (step 650). Peer-to-peer device 180 is the same as that shown in FIG. 1. On the other hand, if a request is not pending, decision 645 branches to "No" branch 649 bypassing data transfer steps.

A determination is made as to whether the watchdog timer has expired (decision 655). If the watchdog timer has not expired, decision 655 branches to "No" branch 657 which loops back to process more requests. This looping continues until the timer expires, at which point decision 655 branches to "Yes" branch 659, whereupon processing sets the adhoc configuration mode busy (e.g. adhoc register 140) at step 660.

A determination is made as to whether to continue processing (decision 670). If processing should continue, decision 670 branches to "Yes" branch 672 which loops back to process more requests. This looping continues until processing should stop, at which point decision 670 branches to "No" branch 674 whereupon processing ends at 680.

Figure 7:
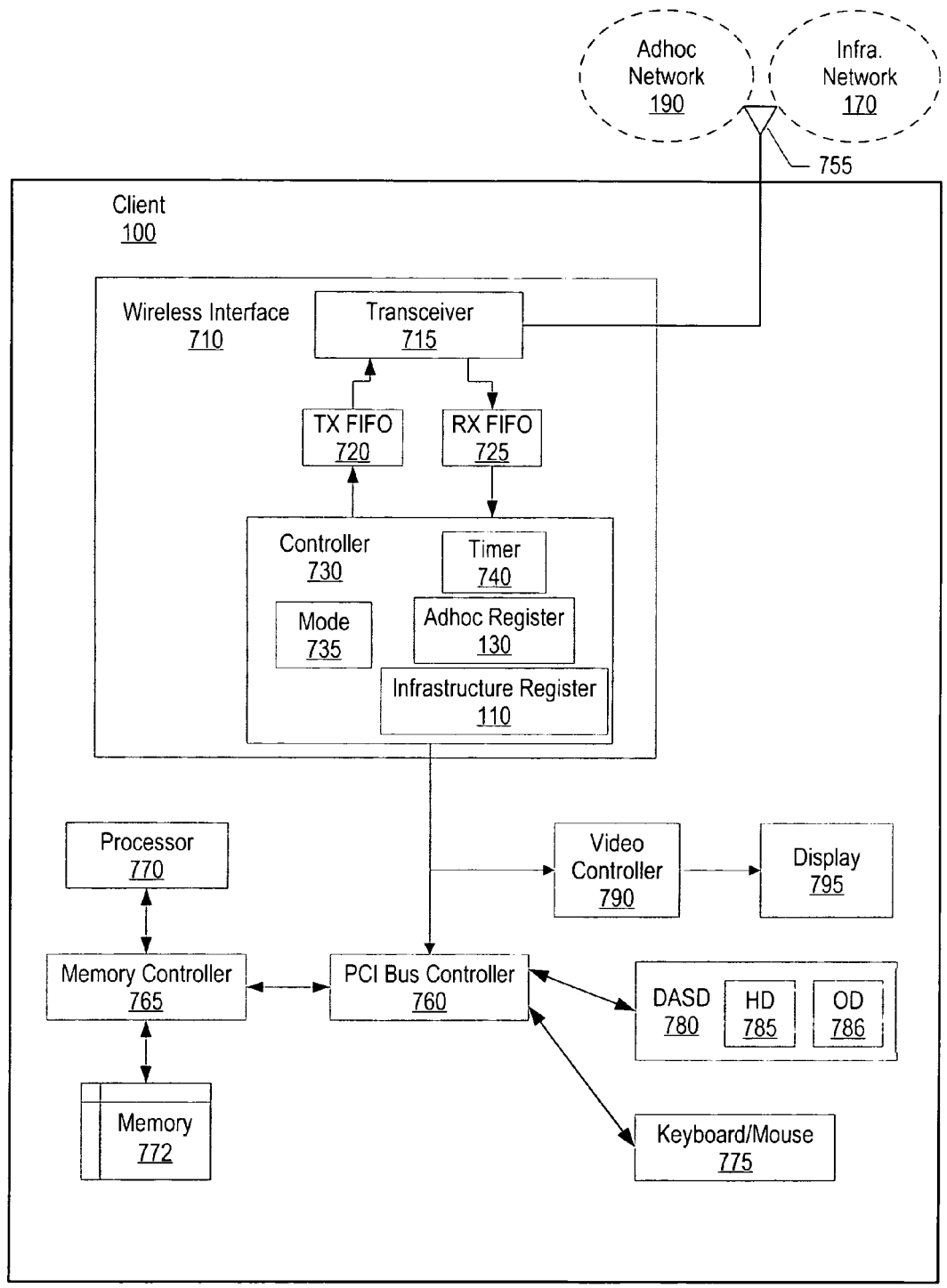
FIG. 7 is a block diagram of an information handling system, such as a client device, capable of implementing the present invention.

FIG. 7 is a block diagram of an information handling system, such as a client device, capable of implementing the present invention. FIG. 7 illustrates client 100 which is a simplified example of a client capable of performing the computing operations described herein. Client 100 includes wireless interface 710 that includes transceiver 715. Transceiver 715 is an RF (radio frequency) transmitter that uses antenna 755 to communicate with other devices on infrastructure network 170 and adhoc network 190. Client 100, infrastructure network 170 and adhoc network 190 are the same as that shown in FIG. 1.

TX FIFO 720 and RX FIFO 725 couple controller 730 to transceiver 715 and are used to buffer transmission and reception of data packets that are sent to and received from network devices. Controller 730 includes mode bit 735, timer 740, adhoc register 130, and infrastructure register 110. Client 100 checks mode bit 735 to determine whether to be in single network mode or dual network mode. Timer 740 is used to identify times at which to switch between modes. Adhoc register 130 includes information pertaining to an adhoc configuration profile. And, infrastructure register 110 includes information pertaining to an infrastructure configuration profile.

PCI bus controller 760 operationally couples a variety of modules within client 100. A standard processing subsection is coupled to PCI bus controller 760 and consists of microprocessor 770, memory controller 765, and memory 772. PCI bus controller 760 is also coupled to keyboard/mouse 775 in which a user uses to input information, such as a network name. PCI bus controller 760 is also coupled to DASD 780 that includes hard drive 785 and optical device 786. Client 100 also includes video controller 790 which displays data on display 795 for a user to view.

While the computer system described in FIG. 7 is capable of executing the processes described herein, this computer system is simply one example of a computer system. Those skilled in the art will appreciate that many other computer system designs are capable of performing the processes described herein.

Figure 8:
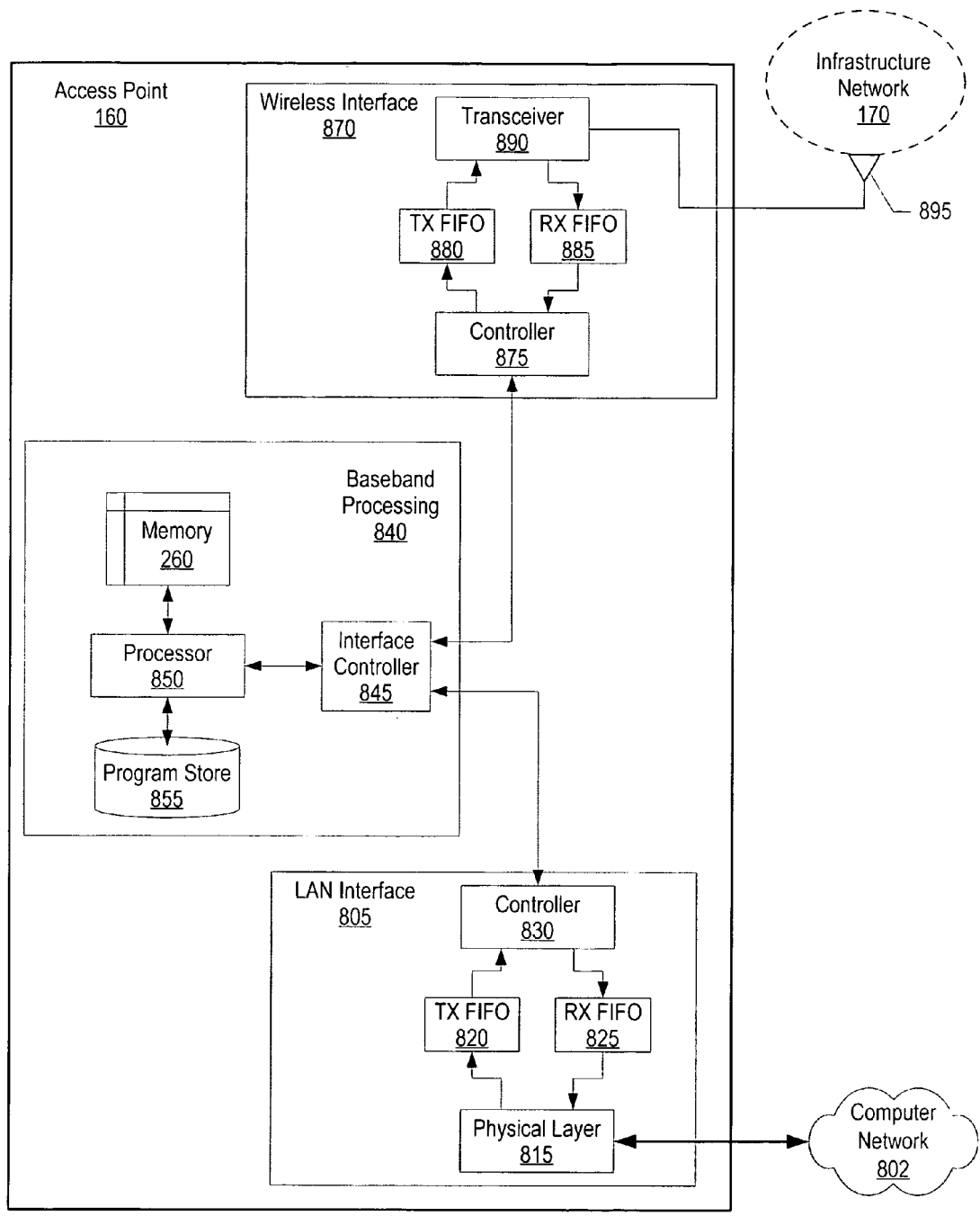
FIG. 8 is a block diagram of an access point that is capable of adapting to the present invention.

FIG. 8 is a block diagram of an access point that is capable of adapting to the present invention. Access point 160 includes three modules which are wireless interface 870, baseband processing 840, and LAN interface 805.

Wireless LAN interface 870 may be any wireless interface using a wireless medium such as RF, infrared, VHF, UHF, or microwave. In one embodiment, wireless interface 870 is implemented as an 802.11 compliant wireless local area network interface. LAN interface 805 may be a wired land-based network interface, an optical network interface, such as a fiber-optic network interface, or a second wireless network interface. In one embodiment, LAN interface 805 is implemented as an interface for an Ethernet land-based network. LAN interface 805 typically connects to or bridges to a backbone network that provides resources and services, such as computer network 802. Wireless LAN interface 870 provides resources and services found on a backbone network to wireless clients that are associated to wireless LAN interface 870.

Baseband processing (or flow controller) 840 bridges and controls the flow of traffic between wireless clients coupled through wireless LAN interface 870 and the backbone network coupled to LAN interface 805. Baseband processing 840 maintains a FIFO buffer for bidirectional traffic between interfaces 870 and 805. Baseband processing 840 may be implemented entirely in hardware, or partially in hardware and partially in software/firmware. In the embodiment shown in FIG. 8, baseband processing 840 is implemented using microprocessor 850 having program storage 855 that stores boot code and microcode for execution on a microprocessor 850. The boot code is typically executed directly from program storage 855 while the microcode is typically transferred to memory 260 for faster execution. Baseband processing 840 also includes interface controller 845 that performs lower-level functions, such as handshaking functions, that are required to interface wireless interface 870 to LAN interface 805.

The construction of wireless interface 870 includes physical layer RF transceiver 890, transmit and receive FIFO's 880 and 885, respectively, and controller 875 for interfacing to baseband processing 840. Wireless LAN interface 870 includes antenna 895 for coupling electromagnetic energy to the atmosphere, such as infrastructure network 170.

The construction of LAN interface 805 includes Ethernet physical layer 815, transmit and receive FIFO's 820 and 825 and controller 830 for interfacing to baseband processing 840. Ethernet physical layer 815 couples to backbone network 802. Controller's 830 and 875 may be implemented in hardware, or as a combination of hardware and software/firmware components. In this embodiment, however, controllers 830 and 875 are implemented in hardware for faster operation.

Figure 9:
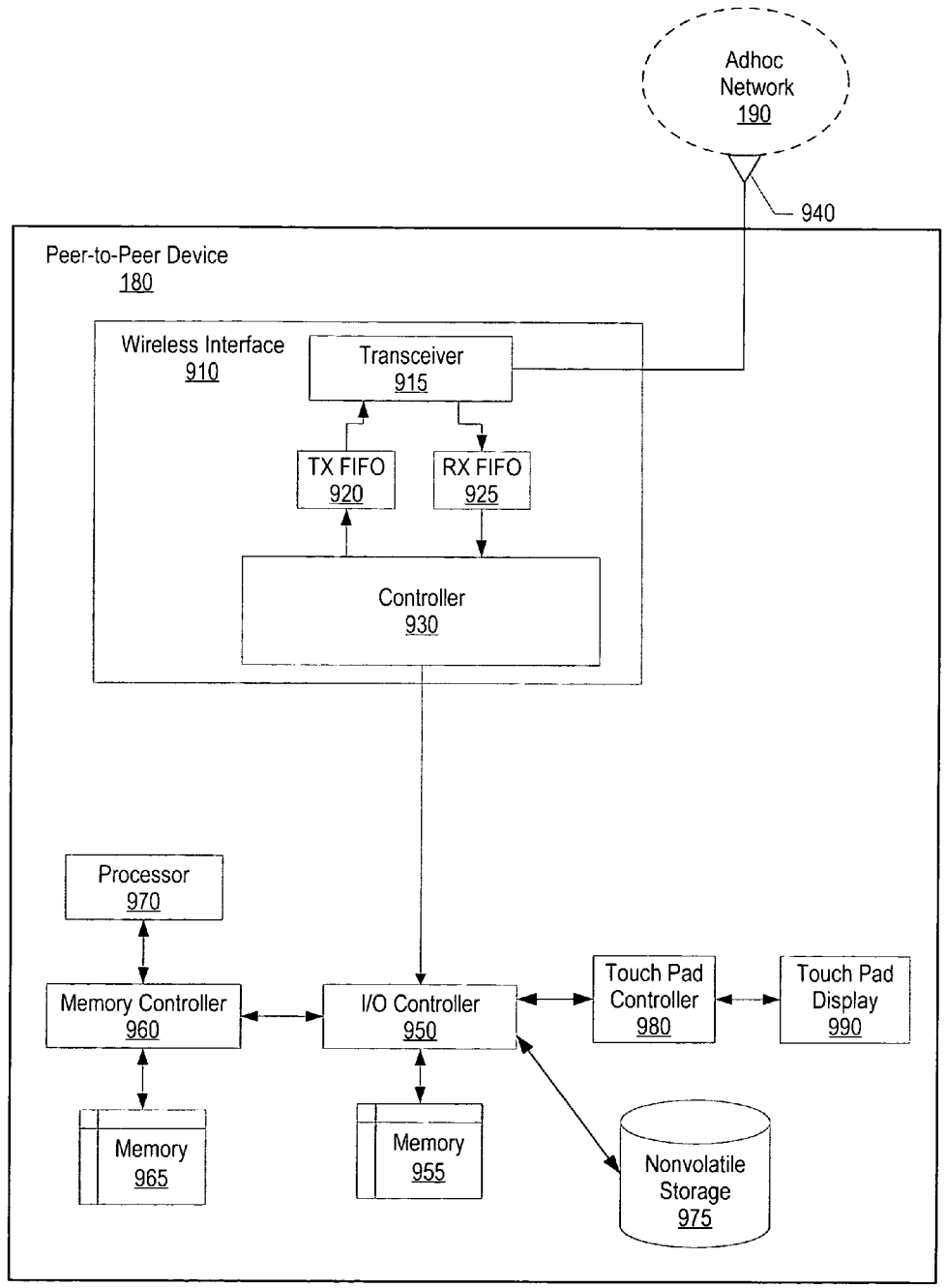
FIG. 9 is a block diagram of peer-to-peer device that is capable of adapting to the present invention.

FIG. 9 is a block diagram of peer-to-peer device that is capable of adapting to the present invention. Peer-to-peer device 180 includes wireless interface 910 that includes transceiver 915. Transceiver 915 is an RF (radio frequency) transmitter that uses antenna 940 to communicate with other devices on adhoc network 160. Peer to peer device 180 and adhoc network 160 are the same as that shown in FIG. 1.

TX FIFO 920 and RX FIFO 925 couple controller 930 to transceiver 915 and are used to buffer transmission and reception of data packets that are sent to and received from network devices. Controller 730 is coupled to I/O controller 950 which manages data flow between input and output devices. I/O controller 950 couples to memory 955 and memory controller 960 which manages memory storage and retrieval with the assistance of processor 970 and memory 965. I/O controller 950 also couples to nonvolatile storage 975 and touch pad controller 980 which receives information from touch pad display 990.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
retrieving an infrastructure configuration profile;
retrieving an adhoc configuration profile;
establishing an infrastructure network connection corresponding to the infrastructure configuration profile using a first transmitter included in a wireless device; and
maintaining the infrastructure network connection while using the first transmitter to concurrently communicate over an adhoc network corresponding to the adhoc configuration profile.

2. The method of claim 1 further comprising:
setting a watchdog timer;
selecting an infrastructure mode, the infrastructure mode corresponding to the infrastructure configuration profile;
detecting the expiration of the watchdog timer;
deselecting the infrastructure mode in response to the detecting; and
selecting an adhoc mode, the adhoc mode corresponding to the adhoc configuration profile.

3. The method of claim 2 further comprising:
using an infrastructure device driver and the first transmitter to maintain the infrastructure network connection while in infrastructure mode;
using an adhoc device driver and the first transmitter to communicate over the ad hoc network while in adhoc mode;
using a code shim as an infrastructure virtual device driver while the first transmitter is used during adhoc mode; and
using the code shim as an adhoc virtual device driver while the first transmitter is used during infrastructure mode.

4. The method of claim 1 wherein communicating over the adhoc network is performed while the wireless device's infrastructure network connection is idle.

5. The method of claim 1 further comprising:
retrieving a configuration mode bit; and
identifying that the configuration bit corresponds to a dual mode.

6. The method of claim 1 further comprising:
polling a plurality of device drivers;
identifying that one of the plurality of device drivers is in a ready state in response to the polling; and
using the identified device driver to transfer data.

7. The method as described in claim 6 wherein the identified device driver is selected from the group consisting of an infrastructure device driver and an adhoc device driver.

8. An information handling system comprising:
one or more processors;
a memory accessible by the processors;
one or more nonvolatile storage devices accessible by the processors; and
a wireless communication tool for concurrently communicating with a plurality of wireless networks, the wireless communication tool comprising software code effective to:
retrieve an infrastructure configuration profile from one of the nonvolatile storage devices;
retrieve an adhoc configuration profile from one of the nonvolatile storage devices;
establish an infrastructure network connection corresponding to the infrastructure configuration profile using a first transmitter included in a wireless device; and
maintain the infrastructure network connection while using the first transmitter to concurrently communicate over an adhoc network corresponding to the adhoc configuration profile.

9. The information handling system of claim 8 wherein the software code is further effective to:
set a watchdog timer;
select an infrastructure mode, the infrastructure mode corresponding to the infrastructure configuration profile;
detect the expiration of the watchdog timer;
deselect the infrastructure mode in response to the detecting; and
select an adhoc mode, the adhoc mode corresponding to the adhoc configuration profile.

10. The information handling system of claim 9 wherein the software code is further effective to:
use an infrastructure device driver and the first transmitter to maintain the infrastructure network connection while in infrastructure mode;
use an adhoc device driver and the first transmitter to communicate over the ad hoc network while in ad hoc mode;
use a code shim as an infrastructure virtual device driver while the first transmitter is used during adhoc mode; and
use the code shim as an adhoc virtual device driver while the first transmitter is used during infrastructure mode.

11. The information handling system of claim 8 wherein communicating over the ad hoc network is performed while the wireless device's infrastructure network connection is idle.

12. The information handling system of claim 8 wherein the software code is further effective to:
retrieve a configuration mode bit from one of the nonvolatile storage devices; and
identify that the configuration bit corresponds to a dual mode.

13. The information handling system of claim 8 wherein the software code is further effective to:
poll a plurality of device drivers;
identify that one of the plurality of device drivers is in a ready state in response to the polling; and
use the identified device driver to transfer data.

14. A program product comprising:
computer operable medium having computer program code, the computer program code being effective to:
retrieve an infrastructure configuration profile;
retrieve an adhoc configuration profile;

establish an infrastructure network connection corresponding to the infrastructure configuration profile using a first transmitter included in a wireless device; and maintain the infrastructure network connection while using the first transmitter to concurrently communicate over an adhoc network corresponding to the adhoc configuration profile.

15. The program product of claim 14 wherein the software code is further effective to:

set a watchdog timer;

select an infrastructure mode, the infrastructure mode corresponding to the infrastructure configuration profile;

detect the expiration of the watchdog timer;

deselect the infrastructure mode in response to the detecting; and select an adhoc mode, the adhoc mode corresponding to the adhoc configuration profile.

16. The program product of claim 15 wherein the software code is further effective to:

use an infrastructure device driver and the first transmitter to maintain the infrastructure network connection while in infrastructure mode;

use an adhoc device driver and the first transmitter to communicate over the ad hoc network while in ad hoc mode;

use a code shim as an infrastructure virtual device driver while the first transmitter is used during adhoc mode; and use the code shim as an adhoc virtual device driver while the first transmitter is used during infrastructure mode.

17. The program product of claim 14 wherein communicating over the ad hoc network is performed while the wireless device's infrastructure network connection is idle.

18. The program product of claim 14 wherein the software code is further effective to:

retrieve a configuration mode bit; and identify that the configuration bit corresponds to a dual mode.

19. The program product of claim 14 wherein the software code is further effective to:

poll a plurality of device drivers;

identify that one of the plurality of device drivers is in a ready state in response to the polling; and use the identified device driver to transfer data.

20. The program product as described in claim 19 wherein the identified device driver is selected from the group consisting of an infrastructure device driver and an adhoc device driver.

* * * * *